US010791224B1

(12) United States Patent
Bar-on (10) Patent No.: US 10,791,224 B1
(45) Date of Patent: Sep. 29, 2020

(54) CHAT CALL WITHIN GROUP CALL (71) Applicant: MOTOROLA SOLUTIONS, INC., Chicago, IL (US)

(72) Inventor: David Bar-on, Rehovot (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/546,146

(22) Filed: Aug. 20, 2019

(51) Int. Cl.
*H04M 3/56* (2006.01)
*H04W 76/45* (2018.01)
*H04W 4/08* (2009.01)
*H04M 3/58* (2006.01)

(52) U.S. Cl.
CPC .......... *H04M 3/567* (2013.01); *H04M 3/561* (2013.01); *H04M 3/58* (2013.01); *H04W 4/08* (2013.01); *H04W 76/45* (2018.02)

(58) Field of Classification Search
CPC ........ H04M 3/567; H04M 3/561; H04M 3/58; H04W 76/45; H04W 4/08
USPC .................................................... 379/202.01
See application file for complete search history.

(56) References Cited

U.S. PATENT DOCUMENTS 5,473,605 A  12/1995  Grube et al.
7,062,286 B2  6/2006  Grivas et al.
9,510,166 B1 *  11/2016  Allen ..................... H04W 76/45
2014/0173430 A1 *  6/2014  Clavel ................. H04L 12/1822
                                                         715/716
2018/0035267 A1 *  2/2018  Barrett ................ H04L 65/4046

FOREIGN PATENT DOCUMENTS

CN      100477707 C    4/2009
CN      104104585 A    10/2014
CN      109120947 A    1/2019
WO      2015/131709 A1 9/2015

* cited by examiner

*Primary Examiner* — Quynh H Nguyen
(74) *Attorney, Agent, or Firm* — Michael Best & Friedrich LLP (57) ABSTRACT

Methods and systems for managing a radio communication group call. One system includes a server configured to be communicatively coupled to a first communication device, a second communication device and a third communication device. The server includes an electronic processor configured to establish a half-duplex group call between the first communication device, the second communication device, and the third communication device. The processor receives, from the second communication device, an audio signal and receives, from the first communication device, a soft preemption talk request. The electronic processor establishes, in response to receiving the soft preemption talk request, a full-duplex private call between the first communication device and the second communication device and transmits audio of the full-duplex private call to the third communication device.

20 Claims, 8 Drawing Sheets

CHAT CALL WITHIN GROUP CALL

BACKGROUND OF THE INVENTION

Some communication devices, for example mobile telephones and two-way radios, provide push-to-talk functionality. Push-to-talk (PTT) is a method of transmitting audio communications over a half-duplex communication channel. PTT is a common way of performing public safety communications (for example, communications between police officers, first responders, and the like).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, PTT communications provide communications between communication devices. Public safety personnel (for example, police officers, emergency personnel, first responders, and the like) use PTT communications when responding to an incident.

In some communication networks, for example, land mobile radio (LMR) and trunked radio networks, PTT communications are used in talk groups. A talk group is a group of communication devices, created by an administrator, in which each communication device in the talk group may participate in a group call. Group calls may be initiated and managed, for example, at a server. A PTT group call is half-duplex meaning, as explained below, audio from a single communication device is shared among the communication devices within the group.

PTT communications are initiated by a user by activating a PTT mechanism (for example, a PTT "hard" or "soft" button) on the user's communication device. A talk request is transmitted to the server and, in response, the server grants the communication device the "floor" (the "lead device"). Audio from the user of the lead device is shared, via the server, with the other communication devices of the talk group. The user of the lead device maintains the PTT mechanism in the activated position or state for as long as they want the communication "floor" (actively share audio). While a lead device has the "floor," audio from other communication devices is muted. The lead device forfeits the communication floor when the PTT mechanism is released. While the group call is active (including when another user has the floor), another device within the talk group may request the floor, for example, in response to a user activating a PTT mechanism on his or her communication device.

During a PTT group call, a user may want to communicate with one or more users in the group while another user has the communication floor. However, and as noted above, group calls are generally structured so that only audio from the lead device is shared. As described in greater detail below, embodiments provide, among other things, mechanisms for providing a voice chat during a group call (referred to as a multimedia chat call (MCC)). While having some conceptual similarities to text chat, MCC has several advantages over text messaging chat. One advantage is that voice chat can be used with simple devices that do not support a text keyboard. Another advantage is that MCC can be extended to conference calls and to video.

One example embodiment provides a server managing a group call between a first communication device, a second communication device, and a target communication device. The server includes an electronic processor configured to receive, from the second communication device, a chat call audio uplink signal including an identifier corresponding to a target communication device and audio for a chat call between the second communication device and the target communication device during the group call. The processor is further configured to determine a chat call transmit factor, receive, from the first communication device, a group audio uplink signal including audio for the group call between the first communication device, the second communication device, and the target communication device, and transmit, to the target communication device, both the audio for the group call and the audio for the chat call when the chat call transmit factor exceeds a threshold.

Another example embodiment provides a method of managing communications at a server managing a group call between a first communication device, a second communication device, and a target communication device. The method includes receiving, from the second communication device, a chat call audio uplink signal including an identifier corresponding to a target communication device and audio for a chat call between the second communication device and target communication device during the group call. The method further includes determining a chat call transmit factor, receiving, from the first communication device, a group audio uplink signal including audio for the group call between the first communication device, the second communication device, and the target communication device, and transmitting, to the second communication device and the target communication device, both the audio for the group call and the audio for the chat call when the chat call transmit factor exceeds a threshold.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components. It should also be understood that the methods and systems described below are not necessarily limited to PTT applications and may be adapted for other types of group call communications, where each participant in the group call has available uplink audio channel (for example, a phone conference call).

Figure 1:
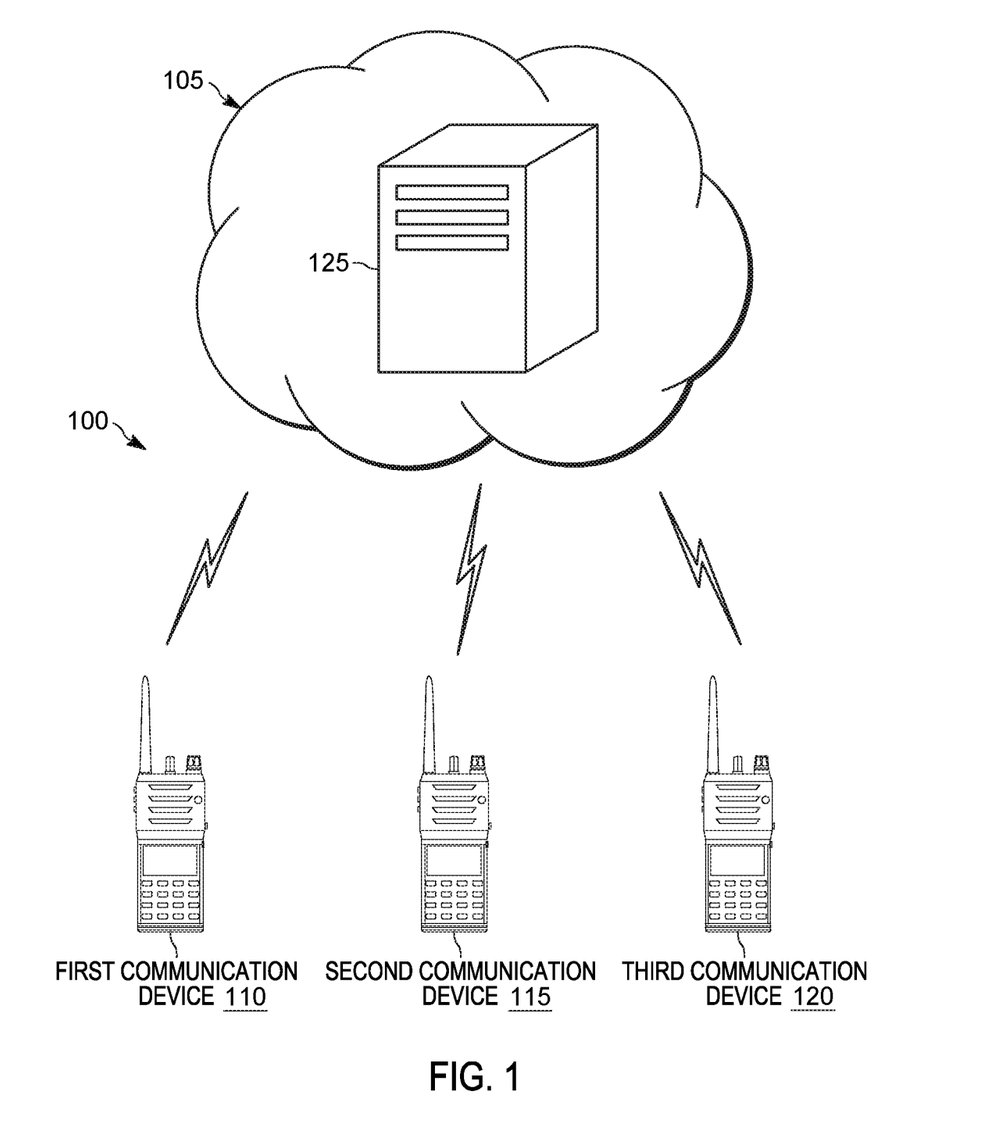
FIG. 1 is a diagram of a communications system in accordance with some embodiments.

FIG. 1 illustrates an example communications system 100. The communications system 100 includes a communication network 105, a first communication device 110, a second communication device 115, and a third communication device 120. The communication network 105 is configured to provide communications between the first communication device 110, the second communication device 115, and the third communication device 120.

The network 105 is a communications network and may include wireless and wired portions configured to support PTT communications. In some embodiments, the network 105 is or includes a radio access network that may operate according to an industry standard land mobile radio (LMR) or cellular protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

In some embodiments, the network 105 includes or is alternatively implemented using a wide area network, for example, the Internet, a local area network, for example, a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof. It should be understood that FIG. 1 depicts the network 105 in a simplified manner, and an actual implementation may include additional components to support other features. For example, the network 105 may include one or more base stations, repeaters, or both.

The network 105 includes a server 125. The server 125 is communicatively coupled to each of the communication devices 110, 115, and 120. The server 125 is configured to manage communication among the communication devices 110, 115, and 120. In some embodiments, network 105 includes hardware, software, or a combination of both configured to assign the first communication device 110, the second communication device 115, the third communication device 120, other communication devices (not shown), or combinations thereof to one or more talk groups and to facilitate communications therebetween. For example, the server 125 may, upon receiving a request from one of the communication devices, establish PTT channels between two or more communication devices.

The first communication device 110, the second communication device 115, and the third communication device 120 transmit and receive voice and data to each other and to other communication devices (not shown) via signals transmitted to and from the network 105 (in particular, the server 125). The communication devices 110, 115, and 120 may each be any type of communication device capable of communicating over the network 105. In some embodiments, one or more of the communication devices 110, 115, and 120 may be different types of communication devices. The communication devices 110, 115, and 120 may be, for example, hand-held radios, vehicle-mounted radios, dispatch radios, or other wireless communication devices compatible with the protocol of the communication network 105.

It should be noted that while FIG. 1 illustrates one configuration of an embodiment of a communications system 100, in other embodiments, the communications system 100, or its components thereof, may have a different configuration. In some embodiments, there may be more or less communication devices communicatively coupled to the network 105 than are illustrated in FIG. 1. In addition, as described below, in some embodiments, the server 125 may be integrated into one or more of the communication devices 110, 115, and 120.

Figure 2:
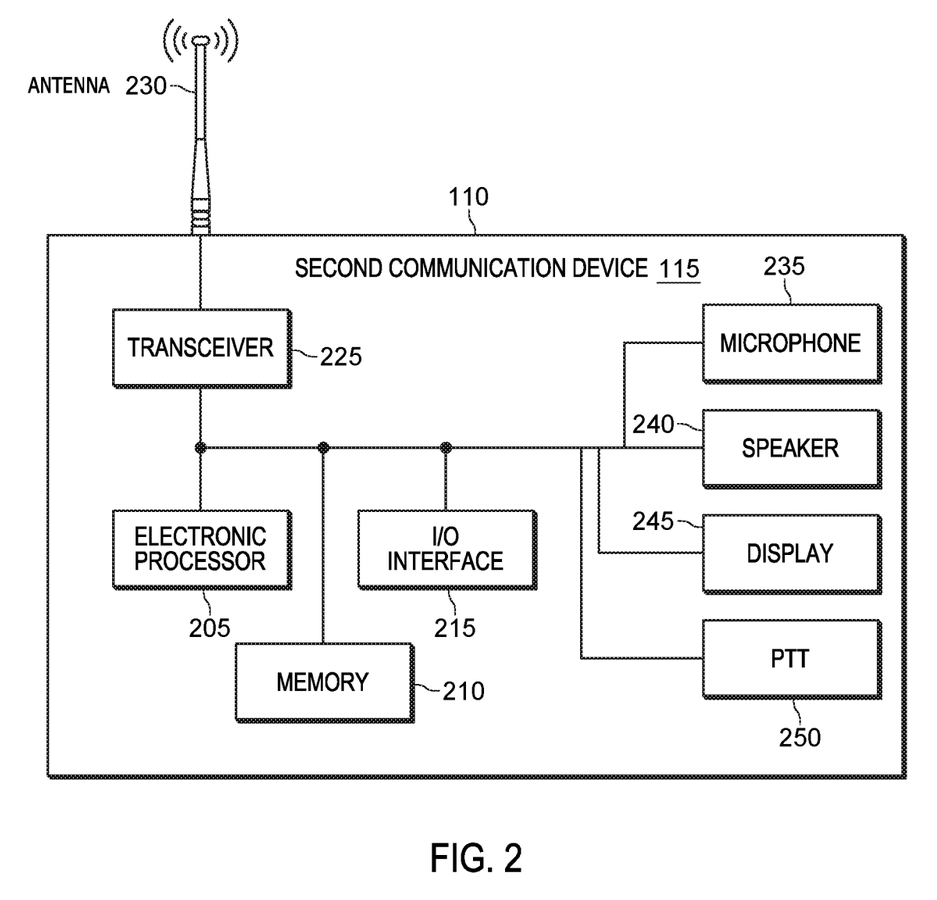
FIG. 2 is a diagram of a communication device included in the communications system of FIG. 1 in accordance with some embodiments.

FIG. 2 is a diagram of the second communication device 115. In the embodiment illustrated, the communication device 115 includes an electronic processor 205, a memory 210, an input/output interface 215, a transceiver 225, an antenna 230, microphone 235, a loudspeaker 240, and a PTT selection mechanism 250. In some embodiments, the communication device 115 may additionally include a display 245.

The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. In some embodiments, the communication device 115 includes fewer or additional components in configurations different from that illustrated in FIG. 2. For example, in some embodiments, the communication device 115 includes multiple microphones, multiple speakers, or combinations thereof.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein.

The input/output interface 215 is configured to receive input and to provide system output. The input/output interface 215 obtains information and signals from, and provides information and signals to, (for example, over one or more wired and/or wireless connections) devices both internal and external to the second communication device 115.

The electronic processor 205 is configured to control the transceiver 225 to transmit and receive audio and other data to and from the communication device 110. The transceiver 225 transmits and receives radio signals to and from, for example, the network 105 using the antenna 230. The electronic processor 205 and the transceiver 225 may include various digital and analog components, which for brevity are not described herein and which may be implemented in hardware, software, or a combination of both. Some embodiments the transceiver 225 includes separate transmitting and receiving components, for example, a transmitter and a receiver, instead of a combined transceiver.

The microphone 235 is a transducer capable of sensing sound, converting the sound to electrical signals, and transmitting the electrical signals to the electronic processor 205. The electronic processor 205 processes the electrical signals received from the microphone 235 to produce an audio stream, which may be transmitted to other devices via the transceiver 225. The loudspeaker 240 is a transducer for reproducing sound from electrical signals (for example, generated from a received audio stream) received from the electronic processor 205. In some embodiments, the microphone 235, the loudspeaker 240, or both may be integrated in a single housing with the other components (for example, in a portable hand-held radio). In some embodiments, the microphone 235, the loudspeaker 240, or both are present in an accessory device (for example, a remote speaker microphone (RSM)) connected via a wired or wireless connection to the communication device 115.

The display 245 is a suitable display, for example, a liquid crystal display (LCD) touch screen, or an organic light-emitting diode (OLED) touch screen. In some embodiments, the communication device 115 implements a graphical user interface (GUI) (for example, generated by the electronic processor 205, from instructions and data stored in the memory 210, and presented on the display 245), that enables a user to interact with the communication device 115.

The PTT selection mechanism 250 allows a user of the communication device 110 to initiate PTT voice communications to one or more other communication devices, either directly or over the network 105. For example, when the electronic processor 205 detects that the PTT selection mechanism 250 is enabled, the electronic processor 205 controls the transceiver 225 to transmit signals created by sound detected by the microphone 235 (for example, as a half-duplex communication signal). When the electronic processor 205 detects that the PTT selection mechanism 250 is no longer enabled (for example, has been released), the transceiver 225 stops transmitting the signals. In some embodiments, the PTT selection mechanism 250 is a mechanical button, key, switch, or knob. In some embodiments, the PTT selection mechanism 250 is provided as part of a graphical user interface (for example, a virtual button) presented on the display 245. The first and third communication devices 110 and 120 (as well as any additional communication devices of the network 105) may be configured in a manner that is similar to the way in which the second communication device 115 is configured.

Figure 3:
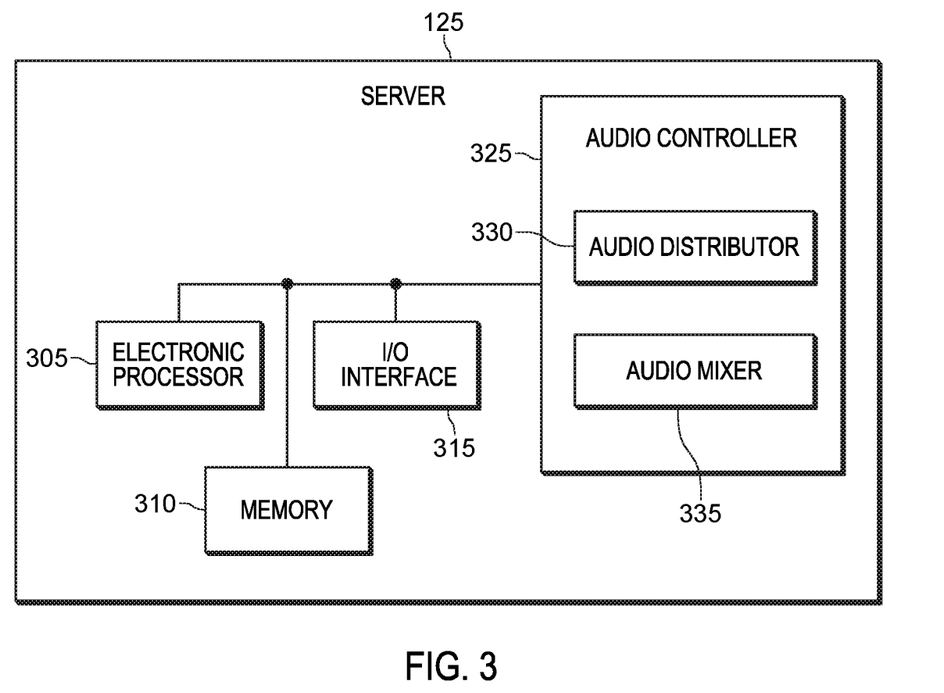
FIG. 3 is a diagram illustrating the server of the communications system of FIG. 1 in accordance with some embodiments.

FIG. 3 is a block diagram of the server 125 in accordance with some embodiments. The server 125 may include, among other things, a server electronic processor 305, a server memory 310, and an input/output (I/O) interface 315. In the illustrated embodiment, the server 125 also includes an audio controller 325 that includes an audio distributor 330 and an audio mixer 325. FIG. 3 depicts the server 125 in a simplified manner, and an actual implementation may include additional components to other features. In some embodiments, the server 125 includes fewer or additional components in configurations different from that illustrated in FIG. 3. In some embodiments, the components of the server 125 are dispersed over several electronic devices external to the server 125. For example, the audio controller 325 may be implemented as a device separate from the server 125. For example, the audio controller 325 may be a standalone server. In some embodiments, some or all of the components and functionality thereof of the server 125 are integrated into a communication device of the system 100. In other embodiments, some or all of the components of the server 125 may be implemented virtually (for example, the memory 310 may be implemented as a cloud-based storage).

The components of the server 125 are communicatively coupled to another via one or more buses or other wired or wireless connections. The server electronic processor 305 is a hardware device, for example a microprocessor, for executing software instructions including the method 400 of FIG. 4 described in more detail below. The server memory 310 includes, for example, a program storage area and a data storage area. The server electronic processor 305 executes software instructions that are capable of being stored in random access memory (RAM) of the server memory 310 (for example, during execution), read-only memory (ROM) of the server memory 310 (for example, on a generally permanent basis), or another non-transitory computer readable medium. The software may include, one or more applications, program data, filters, rules, one or more program modules, and other executable instructions.

The input/output (I/O) interface 315 may provide wired and/or wireless communication between the server 125 and external devices, for example, the communication devices 110, 115, and 120, as well as other communication devices. For example, the I/O interface 315 may include an antenna and transceiver configured similarly to the antenna 230 and transceiver 225 described above.

In some embodiments, the server 125 includes an audio controller 325. The audio controller 325 is configured to process audio signals received, via the I/O interface 315, from the communication devices (for example, communication devices 110, 115, and 120) communicatively coupled to the network 105. The audio controller 325 includes an audio distributor 330 and, in some embodiments, an audio mixer 335. The audio mixer 335 is configured to combine and process audio signals received from one or more of the communication devices 110, 115, and 120. In some embodiments, the audio mixer 335 is alternatively or additionally included in one or more of the communication devices 110, 115, and 120. The audio distributor 330 is configured to distribute the processed audio signals to one or more communication devices within the PTT call (for example, communication devices 110, 115, and 120).

Figure 4:
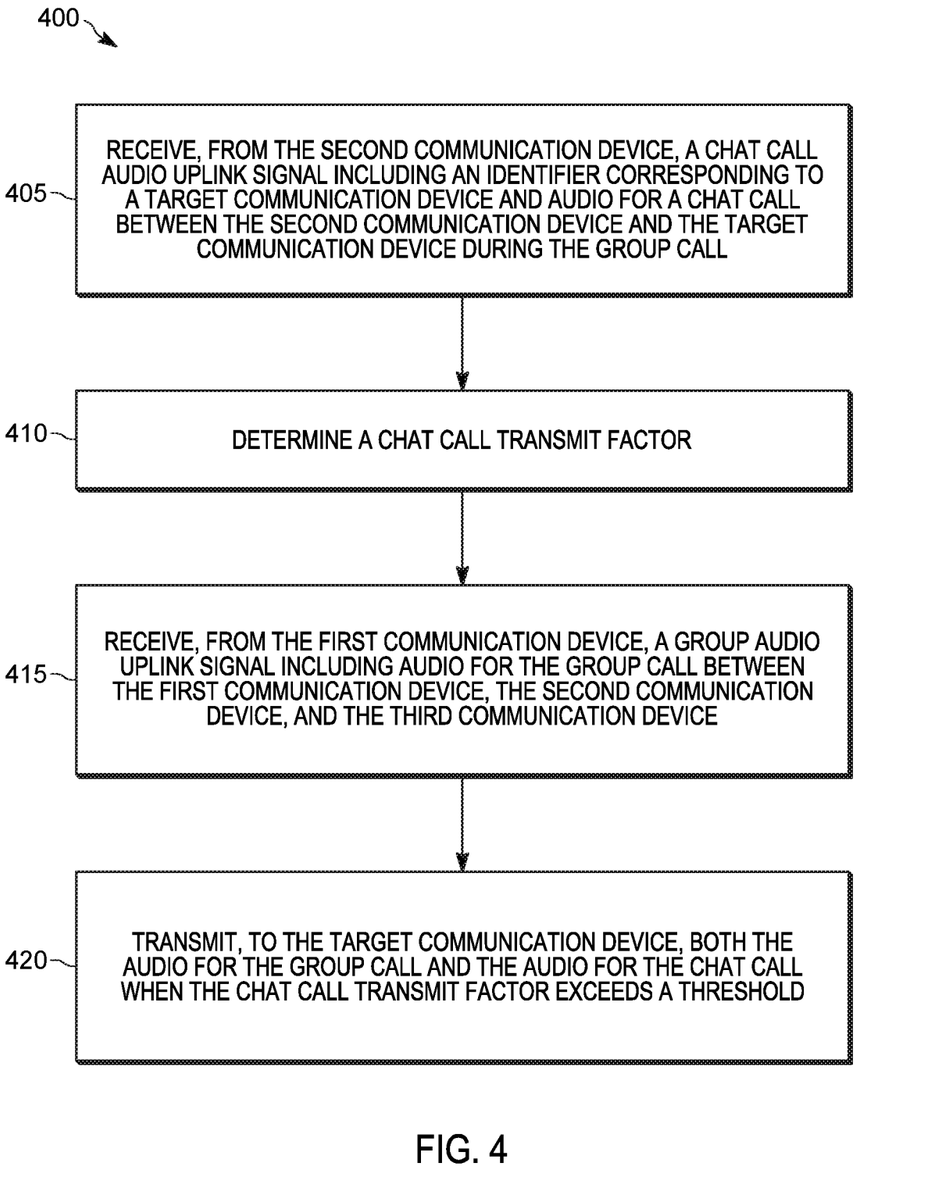
FIG. 4 is a flowchart of a method for managing communications at the server of FIG. 2 between the communication devices of FIG. 1 in accordance with some embodiments.

FIG. 4 is a flowchart illustrating a method or procedure 400 for managing a server managing a radio communication group call between the communication devices 110, 115, and 120 in accordance to some embodiments. As an example, the method 400 is explained in terms of the server 125, in particular the electronic processor 305. However, it should be understood that portions of the method 400 may be distributed among multiple devices (for example, between the server 125 and one or more of the communication device 110, 115, and 120). It should also be understood that, while the method 400 is described in regard to the first communication device 110, the second communication device 115, and the third communication device 120, in some embodiments, the method 400 may be applied to additional communication devices (for example, multiple chat calls may be managed between multiple communication devices).

During a group call (managed by the server 125) between the first communication device 110, the second communication device 115, and the third communication device 120, the electronic processor 305, at block 405, receives a chat call audio uplink signal from the second communication device 115. As described above, a chat call is a private audio call conducted between a subset of communication devices that are participating in the group call. It should be understood that the subset includes at least two of any communication devices participating in the group call. The chat call audio uplink signal includes an identifier corresponding to a target communication device and audio for a chat call between the second communication device and target communication device. The identifier is a unique tag of a communication device participating in the group call (for example, a serial number, a consumer-issued identification, or an assigned PTT group member identifier). In some embodiments, the identifier is included in each frame/packet of the audio uplink signal. In some embodiments, the chat call audio uplink signal includes one or more additional identifiers, each of which corresponding to an additional target communication device. In some embodiments, one or more of the target communication devices are not included in the group call that the second communication device 115 is in.

At block 410, the electronic processor 305 determines a chat call transmit factor. The chat call transmit factor is a condition (of the second communication device 115, the one or more target communication devices, and/or the group call itself) that the electronic processor 305 evaluates to determine whether or not to grant the chat call between the second communication device 115 and the target device(s). At block 415, when the chat transmit factor exceeds a threshold, the electronic processor 305 grants the chat call by transmitting the audio of both the group call and the audio of the chat call to the target communication device (for example, the third communication device). When the chat transmit factor fails to exceed the threshold, the electronic processor 305 modifies or drops the chat call audio uplink signal. In some embodiments, modifying the audio for the chat call includes discarding one or more audio packets of the audio for the chat call. It should be understood that, in some embodiments, the processor 305 determines multiple chat call transmit factors and compares each to a corresponding threshold. The electronic processor 305 may then grant the chat call when a majority of the call transmit factors exceed the thresholds.

A chat call transmit factor may be a priority level of the group call. For example, when the group call is of a high priority (for example, an incident that the group call is related to is an emergency), the electronic processor 305 will not grant the chat call. In some embodiments, the chat call transmit factor is an authority level of a user of the second communication device 115 and the threshold of block 415 is an authority level of the first communication device 110 that has the communication floor in the group call. Alternatively, the threshold may correspond to an authority level of the target communication device. In some embodiments, determining whether the second communication device 115 has permission to conduct the chat call includes comparing a role associated with the second communication device 115 to a role associated with the first communication device 110 or the target communication device. The role corresponds to the role/position of the user of the communication device (for example, chief officer, deputy, and the like). Each role may correspond to a particular authority level as described above.

In some embodiments, the chat call transmit factor is determined based on whether the second communication device 115 has permission to communicate with the target communication device and the chat call transmit factor exceeds the threshold when the second communication device has permission to conduct the chat call with the target communication device. The second communication device 115 may not have permission/be denied permission when the server 125 previously received a request from the target communication device to not grant chat calls (for example, a block chat calls request) with the target communication device (either for chat calls from the second communication device 115 specifically or from any communication devices). The deny permission request may be sent in response to receiving a permission request, from the server 125, to grant the chat call. In some embodiments, the electronic processor 305 is further configured to transmit, to the second communication device 115 in response to receiving the chat call audio uplink signal, an automated audio response when the second communication device does not have permission to conduct the chat call with the target communication device. The automated response is provided to the second communication device 115 to communicate to the user of the second communication device 115 that the chat call was denied. In some embodiments, the automated response is part of a chat call to the second communication device 115 from the target communication device.

Figure 5:
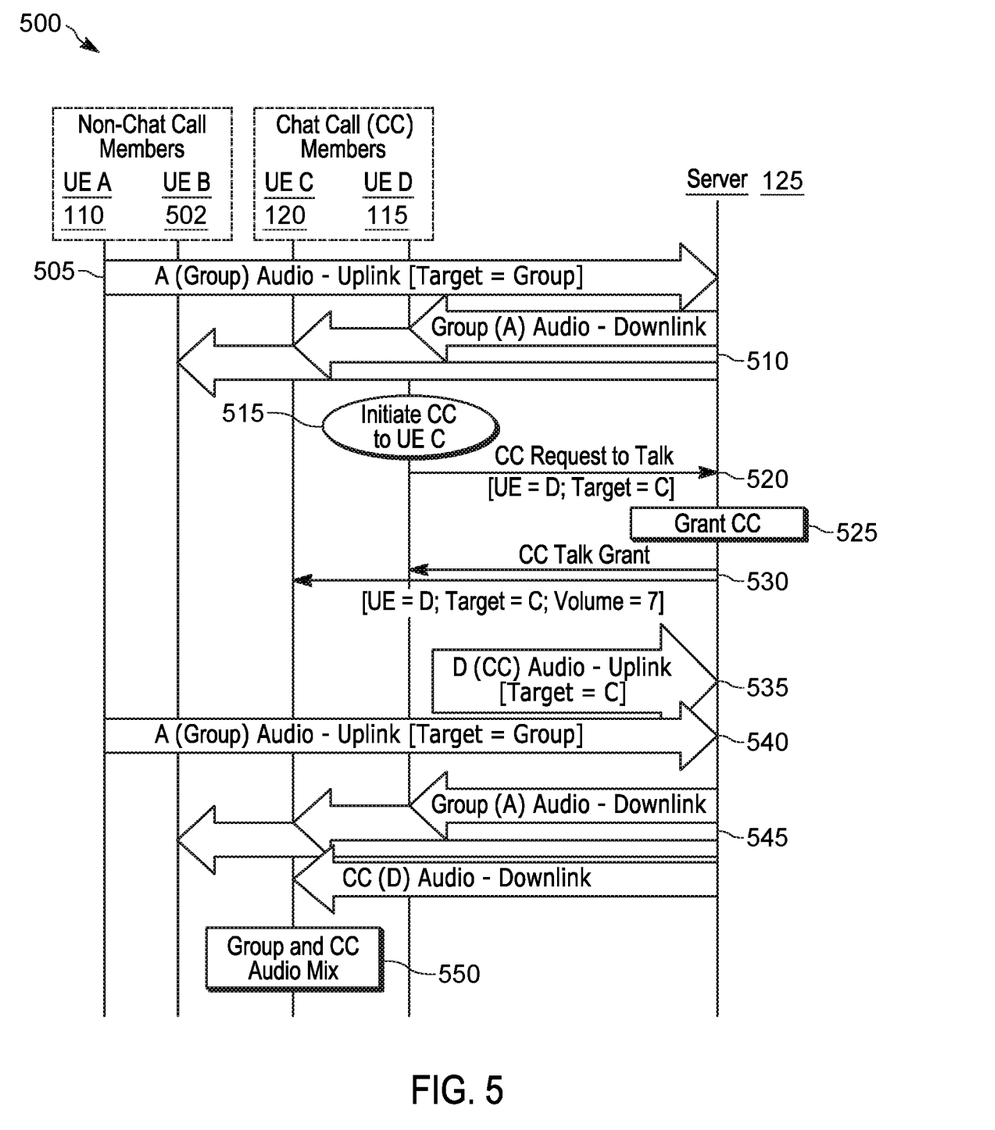
FIG. 5 is a message flow diagram illustrating the method 400 in more detail and in accordance with some embodiments.

FIG. 5 is a message flow diagram 500 illustrating the method 400 in accordance with some embodiments. The message flow diagram 500 is described herein in terms of the first communication device 110 (UE A), the second communication device 115 (UE D), the third communication device 120 (UE C), a fourth communication device 502 (UE B), and the server 125. However, the method may be applied to talk groups with a different number of communication devices.

At step 505, the first communication device 110 transmits, to the server 125, an audio group call uplink signal including audio for the group call. At step 510, the server 125 transmits (for example, via the audio distributor 330) the audio for the group call to the communication devices of the group call (the second communication device 115, the third communication device 120, and the fourth communication device 502). The second communication device 115 receives, from a user of the second communication device 115, a request to initiate a chat call with the third communication device 120 (step 515).

In some embodiments, the audio chat call uplink signal includes a chat call request. In further embodiments, the second communication device 115 transmits a first part of the audio chat call uplink signal, for example, the chat call request and the identifier of the target communication device. The second communication device 115 may then, in response to the server granting the call, transmit the remaining audio chat call uplink signal, including the audio of the chat call to the server 125.

For example, as shown in FIG. 5, the second communication device 115 transmits the chat call request and identifier of the target communication device (here, the third communication device 120) to the server 125 first (step 520). The server 125, after receiving the chat call request, either grants or denies the request based on, for example, whether or not the chat call transmit factor exceeds a threshold (similar to block 420 of the method 400 described above). At step 525, when the server 125 grants the chat call, the server 125 transmits, a talk grant signal to the second and the target communication device at step 530 (here, the third communication device 120). In response to receiving the talk grant signal, the second communication device 115 transmits audio for the chat call (the second part of the audio chat call uplink signal) to the server 125 (step 535). The first communication device 110, at step 540, transmits a group audio call uplink signal including audio for the group call between the first communication device 110, the second communication device 115, the third communication device 120, and the fourth communication device 502. The server 125 receives the group audio call uplink signal and transmits the audio for the group call to the second communication device 115, the third communication device 120, and the fourth communication device 502 and the audio for the chat call to the target communication device (the third communication device 120) at step 545.

In some embodiments, the audio of both the group call and the chat call are mixed at the server 125, producing a mixed audio signal. The server 125 then transmits the mixed audio signal to the target communication device. Alternatively, the server 125 transmits the audio of the group call and the audio of the chat call to the target communication device and the target communication device produces the mixed signal by mixing the audio of the group call and the audio of the chat call locally (step 550). In some embodiments, producing the mixed signal includes adjusting a volume level of one or more audio packets of the audio for the group call and the audio for the chat call (for example, to reduce background noise present in either audio signals).

Figure 6:
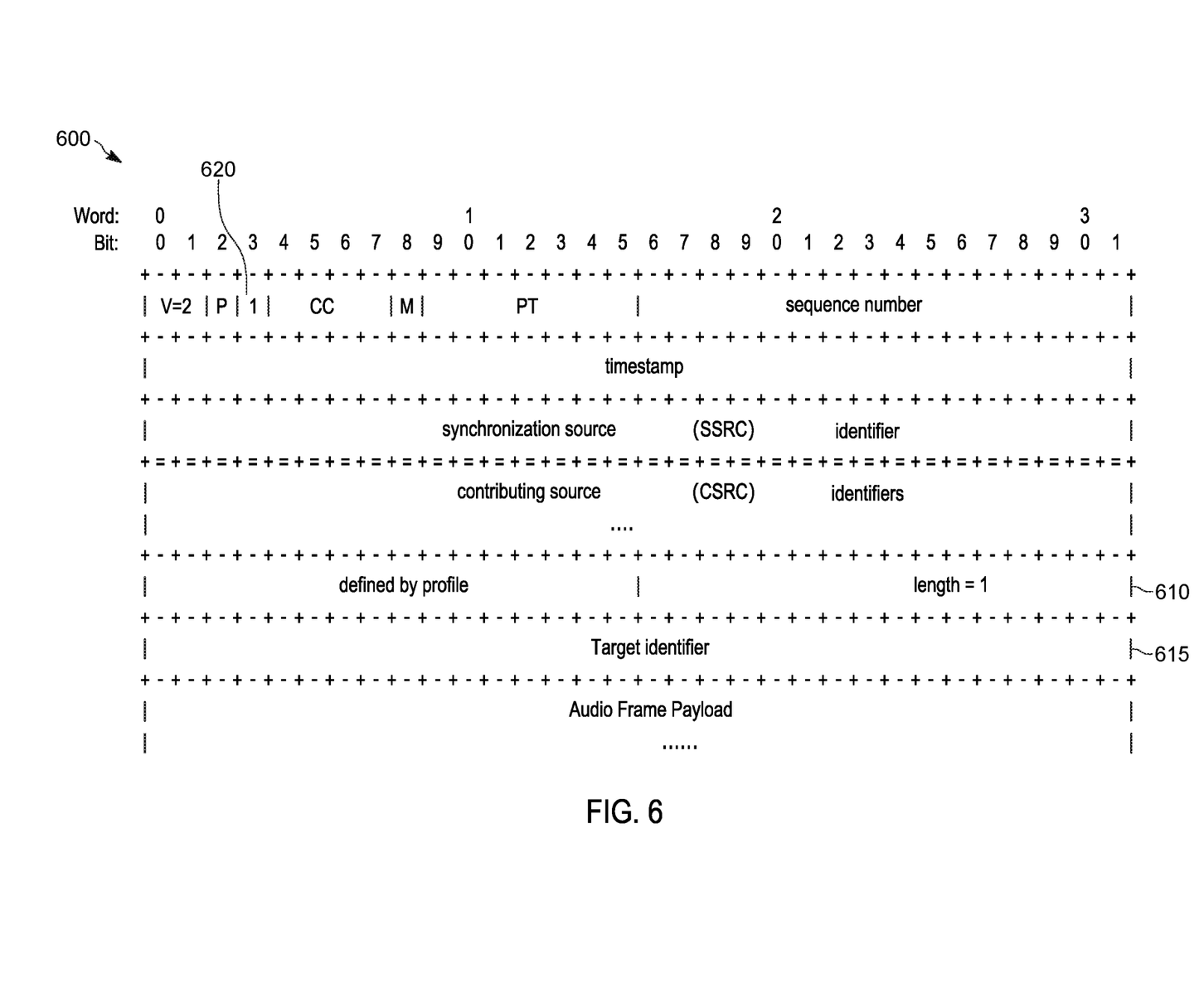
FIG. 6 is an audio packet structure diagram of an audio packet transmitted by the communication device of FIG. 2 in accordance with some embodiments.

FIG. 6 is an example audio packet structure 600 included in the audio chat call uplink signal transmitted by the second communication device 115 in accordance with some embodiments. The illustrated packet structure 600 is a real-time transport protocol (RTP) packet (RFC3550). The packet structure 600 includes a header extension (header extension 605) which includes the identifier of the target communication device (identifier 610). Extension bit 615 is set, indicating that there is an extension header in the audio packet.

Figure 7A:
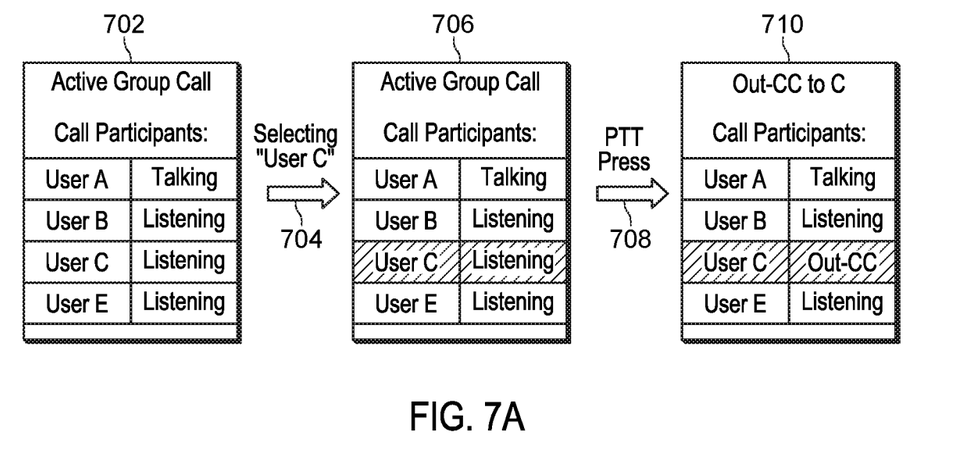
FIG. 7A is a graphical user interface presented on a communication device of FIG. 1 in accordance with some embodiments.

FIG. 7A illustrates graphical windows 702, 706, and 710 of a graphical user interface that is, in some embodiments, displayed on the second communication device 115 when requesting or initiating a chat call with a target communication device. Window 702 includes a list of participants of the group call (users A, B, C, and E corresponding to communication devices 110, 502, 120, and an additional communication device respectively) and their corresponding statuses (here, talking or listening). When no user (target device) is selected, the user of the second communication device 115 may select/actuate the PTT mechanism 250 to transmit a request to talk in the group call. When the user selects a target communication device from the list (here, user C in action 704), the selected device may be highlighted (window 706). After selecting the target communication device, the user of the second communication device 115 may initiate (or request) the chat call with the target device by pressing/actuating the PTT mechanism 250 (action 708). The second communication device 115 may then display whether the chat call was granted (as shown in window 710). It should be understood that in some embodiments, other selection methods may be used (for example, voice command, using buttons on the display 245, particular actuation patterns of the PTT mechanism 250, and the like).

Figure 7B:
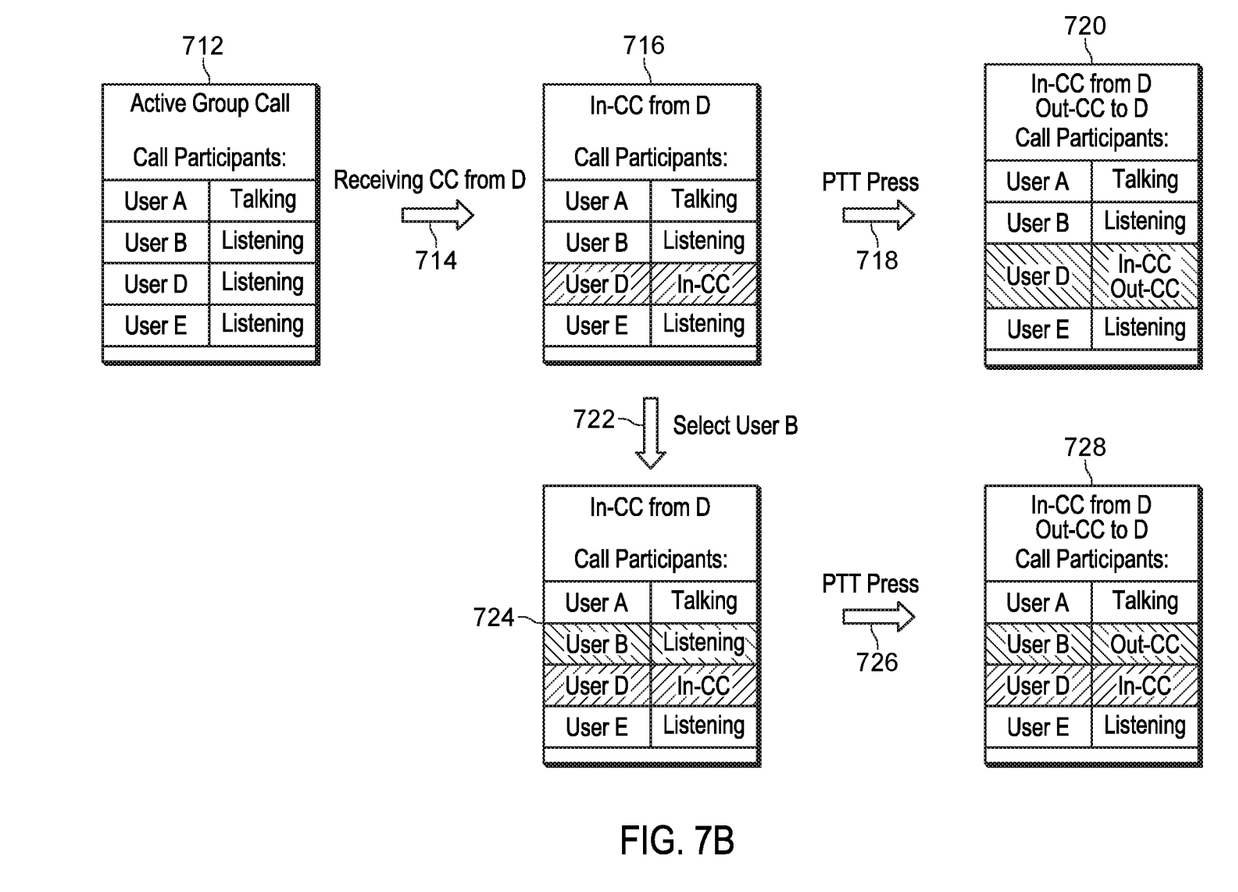
FIG. 7B is a graphical user interface presented on a communication device of FIG. 1 in accordance with some embodiments.

FIG. 7B illustrates graphical windows 712, 716, 720, 724, and 728 of a graphical user interface that is, in some embodiments, displayed on the third (target) communication device 120 when replying to the chat call with the second communication device 115 or initiating another chat call with another target communication device. Window 712 includes a list of the group call participants and their corresponding statuses (similar to window 702 of FIG. 7A). Upon receiving the audio of the chat call in addition to the audio of the group call from the server 125 (action 714), the status of the second communication device 115 (User D) changes to indicate that it is participating in the chat call as shown in window 716 ("IN-CC"). Here, the user of the third communication device 120 may respond to the second communication device 115 in the chat call, for example, by activating a PTT button of the device 115 and speaking into a microphone. The audio is transmitted to the server 125 from the third communication device and, in some embodiments, is processed by the server 125 similar to the audio chat call uplink signal as described in method 400. In other words, the audio response in the chat call may be processed as a new chat call.

The third communication device 120 may also initiate a chat call with another device (for example, the fourth device 502) when a user of the third communication device selects another device/user from the list (action 722 and window 724, similar to action 704 and window 706 of FIG. 7A). Here, the user of the third communication device 120 may initiate or request a chat call with the fourth communication device 502, for example, by activating a PTT button of the device 115 and speaking into a microphone. The audio is transmitted to the server 125 from the third communication device and, in some embodiments, is processed by the server 125 similar to the audio chat call uplink signal as described in method 400.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server managing a group call between a first communication device, a second communication device, and a target communication device, the server comprising:
   an electronic processor configured to:
      receive, from the second communication device, a chat call audio uplink signal including an identifier corresponding to a target communication device and audio for a chat call between the second communication device and the target communication device during the group call;
      determine a chat call transmit factor;
      receive, from the first communication device, a group audio uplink signal including audio for the group call between the first communication device, the second communication device, and the target communication device; and
      transmit, to the target communication device, both the audio for the group call and the audio for the chat call when the chat call transmit factor exceeds a threshold
   wherein the chat call is a private audio call between the second communication device and the target communication device during the group call.

2. The server of claim 1, wherein the electronic processor is further configured to mix the audio for the group call with the audio for the chat call, producing a mixed audio signal and wherein transmitting both the audio for the group call and the audio for the chat call includes transmitting the mixed audio signal to the target communication device of the identifier.

3. The server of claim 2, wherein producing the mixed signal includes adjusting a volume level of one or more audio packets of the audio for the group call and the audio for the chat call.

4. The server of claim 1, wherein the electronic processor is further configured to, in response to the chat call failing to exceed the threshold, to modify or drop the audio for the chat call.

5. The server of claim 4, wherein modifying the audio for the chat call includes discarding one or more audio packets of the audio for the chat call.

6. The server of claim 1, wherein determining the chat call transmit factor includes determining whether a priority level of the group call exceeds a priority level of the chat call.

7. The server of claim 6, wherein the chat call transmit factor exceeds the threshold when the priority level of the group call fails to exceed the priority level of the chat call.

8. The server of claim 1, wherein determining the chat call transmit factor includes determining whether the second communication device has permission to conduct the chat call with the target communication device and wherein the chat call transmit factor exceeds the threshold when the second communication device has permission to conduct the chat call with the target communication device.

9. The server of claim 8, wherein the electronic processor is further configured to transmit to the second communication device, in response to receiving the chat call audio uplink signal, an automated audio response when the second communication device does not have permission to conduct the chat call with the target communication device.

10. The server of claim 8, wherein determining whether the second communication device has permission to conduct the chat call includes comparing a role associated with the second communication device to a role associated with the first communication device.

11. The server of claim 8, wherein the second communication device does not have permission to conduct the chat call with the target communication device when the electronic processor receives a block chat calls request from the target communication device.

12. The server of claim 1, wherein the chat call audio uplink signal includes a second identifier of a second target communication device and wherein the electronic processor is further configured to transmit both the audio for the group call and the audio for the chat call to the second target communication device when the chat call transmit factor exceeds the threshold.

13. A method of managing communications at a server managing a group call between a first communication device, a second communication device, and a target communication device, the method comprising:
    receiving, from the second communication device, a chat call audio uplink signal including an identifier corresponding to a target communication device and audio for a chat call between the second communication device and target communication device during the group call;
    determining a chat call transmit factor;
    receiving, from the first communication device, a group audio uplink signal including audio for the group call between the first communication device, the second communication device, and the target communication device; and
    transmitting, to the second communication device and the target communication device, both the audio for the group call and the audio for the chat call when the chat call transmit factor exceeds a threshold
    wherein the chat call is a private audio call between the second communication device and the target communication device during the group call.

14. The method of claim 13, the method further comprising mixing the audio for the group call with the audio for the chat call, producing a mixed audio signal and wherein transmitting both the audio for the group call and the audio for the chat call includes transmitting the mixed audio signal.

15. The method of claim 14, wherein producing the mixed signal includes adjusting a volume level of one or more audio packets of the audio for the group call and the audio for the chat call.

16. The method of claim 13, the method further comprising modifying or dropping the audio for the chat call in response to the chat call failing to exceed the threshold.

17. The method of claim 16, wherein modifying the audio for the chat call includes discarding one or more audio packets of the audio for the chat call.

18. The method of claim 13, wherein determining the chat call transmit factor includes determining whether a priority level of the group call exceeds a priority level of the chat call.

19. The method of claim 18, wherein the chat call transmit factor exceeds the threshold when the priority level of the group call fails to exceed the priority level of the chat call.

20. The method of claim 13, wherein determining the chat call transmit factor includes determining whether the second communication device has permission to conduct the chat call with the third communication device and wherein the chat call transmit factor exceeds the threshold when the second communication device has permission to conduct the chat call with the target communication device.

* * * * *